US005642518A

United States Patent [19]

Kiyama et al.

[11] Patent Number: 5,642,518

[45] Date of Patent: Jun. 24, 1997

[54] KEYWORD ASSIGNING METHOD AND SYSTEM THEREFOR

[75] Inventors: Tadahiro Kiyama, Ichikawa; Hiroshi Tsuji, Itami, both of Japan

[73] Assignee: Hitachi, Ltd., Tokyo, Japan

[21] Appl. No.: 258,755

[22] Filed: Jun. 13, 1994

[30] Foreign Application Priority Data

Jun. 18, 1993 [JP] Japan .................................. 5-172464

[51] Int. Cl.[6] .................................................. G06F 17/30

[52] U.S. Cl. .......................... 395/757; 395/759; 395/760; 395/613

[58] Field of Search ......................... 364/419.19, 419.08; 395/600, 757, 759, 760

[56] References Cited

U.S. PATENT DOCUMENTS 5,276,616 1/1994 Kuga et al. ........................ 364/419.08

*Primary Examiner*—Robert A. Weinhardt

*Assistant Examiner*—Gita Shingala

*Attorney, Agent, or Firm*—Fay, Sharpe, Beall, Fagan, Minnich & McKee

[57] ABSTRACT

A keyword assigning system divides text data into words, stores results of the division in a table, detects numbers of occurrence times of words in each text data, registers them in a table, and obtains word occurrence frequencies in domains on the basis of the table. The system then extract keywords from the text data by domain on the basis of a resulted domain-wise word occurrence collection table, and extracts negligible word not capable of becoming keywords by domain. The system further registers the extracted domain-wise keywords and negligible words in a keyword-negligible word dictionary, looks the keywords and negligible words registered in the dictionary upon assignment of the keywords to the text data to extract words to become keywords from among the words of the text data to have the keywords assigned thereto, and assign the extracted keywords to the text data, thereby automatically making extraction and assignment of most of the keywords.

20 Claims, 19 Drawing Sheets

FIG. 4

{DOMAIN NAME} : LANGUAGE PROCESSING

{TEXT NO.} : 1

{KIND} : RESEARCH REPORT

< TITLE >
A STUDY ON A DICTIONARY GENERATING METHOD

< SUMMARY >
A RESULT OF STUDY RELATED TO A GENERATION METHOD OF A DICTIONARY WHICH HAS CORRESPONDENCIES BETWEEN HEADER STRINGS AND WORDS IN A DB, IN A PROCESSING SYSTEM GENERATING DICTIONARY INFORMATION REFERRED BY A NATURAL LANGUAGE INTERFACE, GENERATING WORD INFORMATION HAVING CHARACTER STRINGS CONSTRUCTING WORDS IN THE DB, AS HEADER STRINGS OF DICTIONARY INFORMATION.

< OBJECT > . . . . . . . . . . . . . . . . . . . . . . . . . . . . . .
. . . . . . . . . . . . . . . . . . . . . . . . . . . . . . . . . . .
. . . . . . . . . . . . . . . . . . . . . . . . . . . . . . . . . . .

< ESSENTIALS >
. . . . . . . . . . . . . . . . . . . . . . . . . . . . . . . . . . .
. . . . . . . . . . . . . . . . . . . . . . . . . . . . . . . . . . .

< FUTURE PROBLEMS >
. . . . . . . . . . . . . . . . . . . . . . . . . . . . . . . . . . .
. . . . . . . . . . . . . . . . . . . . . . . . . . . . . . . . . . .

FIG. 5 b1 b2 b3 b4 b5 b6

| HEADER STRINGS | PART OF SPEECH | POSITION | ITEM | DOMAIN NAME | TEXT NO. |
|---|---|---|---|---|---|
| TITLE | NOUN | 1ST ROW | TITLE | LANGUAGE PROCESSING | 1 |
| DICTIONARY | NOUN | 2ND ROW | TITLE | LANGUAGE PROCESSING | 1 |
| GENERATION | NOUN | 2ND ROW | TITLE | LANGUAGE PROCESSING | 1 |
| METHOD | NOUN | 2ND ROW | TITLE | LANGUAGE PROCESSING | 1 |
| RELATION | VERB | 2ND ROW | TITLE | LANGUAGE PROCESSING | 1 |
| ONE | NUMERAL | 2ND ROW | TITLE | LANGUAGE PROCESSING | 1 |
| TITLE | "SURU" VERB | 3RD ROW | TITLE | LANGUAGE PROCESSING | 1 |
| SUMMARY | NOUN | 4TH ROW | SUMMARY | LANGUAGE PROCESSING | 1 |
| NATURAL LANGUAGE | NOUN | 4TH ROW | SUMMARY | LANGUAGE PROCESSING | 1 |
| INTERFACE | NOUN | 4TH ROW | SUMMARY | LANGUAGE PROCESSING | 1 |
| REFERENCE | "SURU" VERB | 4TH ROW | SUMMARY | LANGUAGE PROCESSING | 1 |
| ⋮ | ⋮ | ⋮ | ⋮ | ⋮ | ⋮ |

| C1 HEADER STRINGS | C2 PART OF SPEECH | C3 TITLE | C4 SUM-MARY | C5 OBJECT | C6 ESSEN-TIALS | C7 FUTURE PROBLEMS | C8 CONCLU-SION | C9 TOTAL SUM | C10 DOMAIN NAME | C11 TEXT NO. |
|---|---|---|---|---|---|---|---|---|---|---|
| NATURAL LANGUAGE | NOUN | 0 | 1 | 1 | 13 | 2 | 2 | 19 | LANGUAGE PROCESSING | 1 |
| DICTIONARY | NOUN | 1 | 2 | 1 | 15 | 2 | 5 | 26 | LANGUAGE PROCESSING | 1 |
| GENERATION | NOUN | 1 | 3 | 1 | 21 | 3 | 4 | 33 | LANGUAGE PROCESSING | 1 |
| METHOD | NOUN | 1 | 0 | 1 | 20 | 2 | 3 | 27 | LANGUAGE PROCESSING | 1 |
| . | . | . | . | . | . | . | . | . | . | . |
| . | . | . | . | . | . | . | . | . | . | . |
| . | . | . | . | . | . | . | . | . | . | . |

FIG. 9

| W1 | W2 | W3 | | |
|---|---|---|---|---|
| HEADER STRINGS | PART OF SPEECH | OCCURRENCE FREQUENCY | | |
| | | LANGUAGE PROCESSING | ELECTRIC CIRCUIT | FOODS |
| ANALOG | NOUN | 0% | 8% | 0% |
| INTEGRATED | NOUN | 0% | 23% | 0% |
| CIRCUIT | NOUN | 0% | 18% | 0% |
| CURRENT | NOUN | 0% | 15% | 0% |
| • | • | • | • | • |
| DICTIONARY | NOUN | 13% | 0% | 0% |
| KEYWORD | NOUN | 12% | 0% | 0% |
| NEGLIGIBLE WORD | NOUN | 8% | 0% | 0% |
| CONTEXT | NOUN | 18% | 0% | 0% |
| • | • | • | • | • |
| SYNTAX | NOUN | 86% | 3% | 0% |
| ANALYSE | "SURU" VERB | 92% | 5% | 0% |
| • | • | • | • | • |
| INVESTIGATION | NOUN | 100% | 100% | 100% |
| OBJECT | NOUN | 100% | 100% | 100% |
| PROBLEM | NOUN | 100% | 100% | 100% |
| • | • | • | • | • |
| METHOD | NOUN | 98% | 82% | 87% |
| FORGOING | NOUN | 23% | 18% | 62% |
| SAID | NOUN | 56% | 60% | 70% |
| INPUT | NOUN | 62% | 63% | 56% |
| ⋮ | ⋮ | ⋮ | ⋮ | ⋮ |

FIG. 13

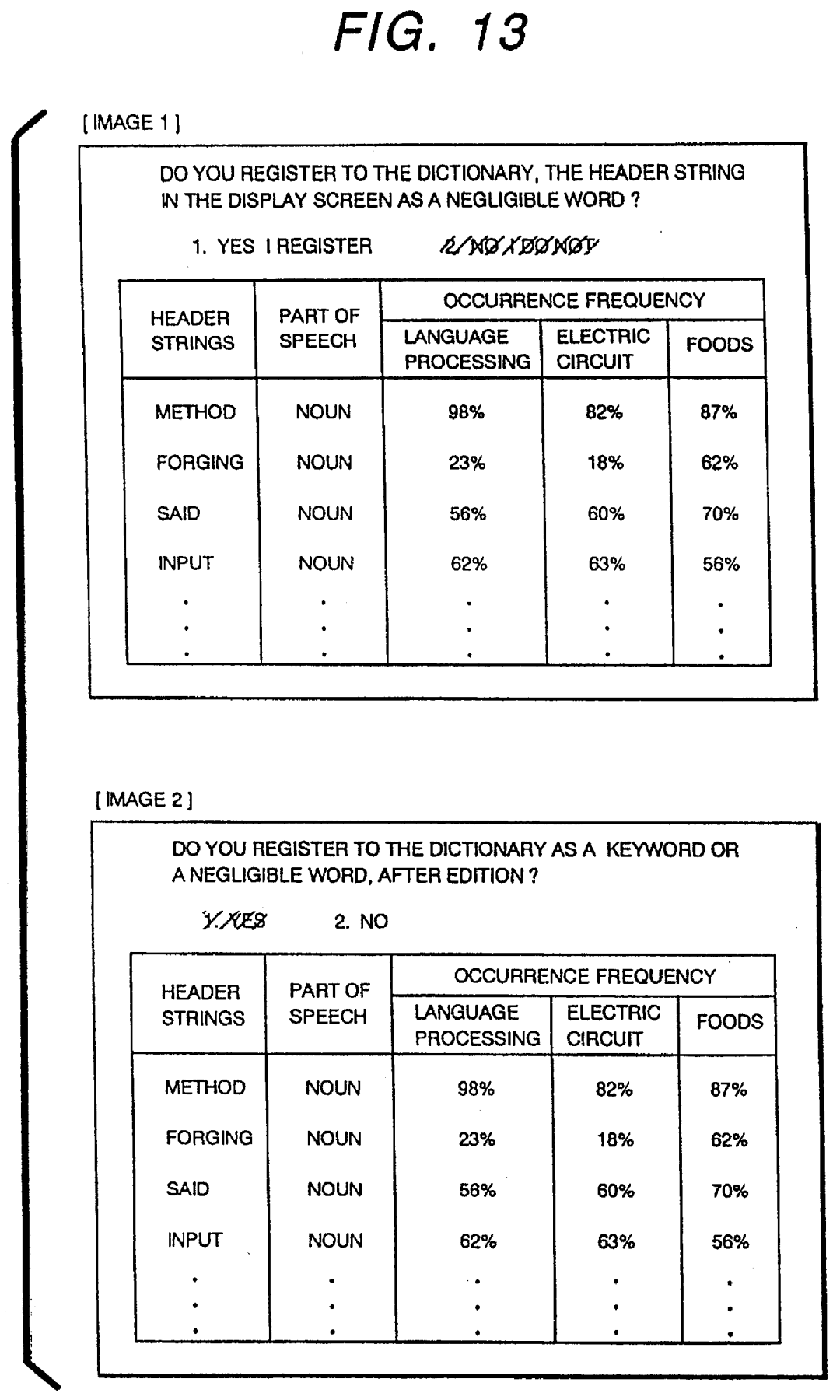

[ IMAGE 1 ]

DO YOU REGISTER TO THE DICTIONARY, THE HEADER STRING IN THE DISPLAY SCREEN AS A NEGLIGIBLE WORD ?

1. YES I REGISTER ~~2. NO I DO NOT~~

| HEADER STRINGS | PART OF SPEECH | OCCURRENCE FREQUENCY | | |
|---|---|---|---|---|
| | | LANGUAGE PROCESSING | ELECTRIC CIRCUIT | FOODS |
| METHOD | NOUN | 98% | 82% | 87% |
| FORGING | NOUN | 23% | 18% | 62% |
| SAID | NOUN | 56% | 60% | 70% |
| INPUT | NOUN | 62% | 63% | 56% |
| ⋮ | ⋮ | ⋮ | ⋮ | ⋮ |

[ IMAGE 2 ]

DO YOU REGISTER TO THE DICTIONARY AS A KEYWORD OR A NEGLIGIBLE WORD, AFTER EDITION ?

~~1. YES~~ 2. NO

| HEADER STRINGS | PART OF SPEECH | OCCURRENCE FREQUENCY | | |
|---|---|---|---|---|
| | | LANGUAGE PROCESSING | ELECTRIC CIRCUIT | FOODS |
| METHOD | NOUN | 98% | 82% | 87% |
| FORGING | NOUN | 23% | 18% | 62% |
| SAID | NOUN | 56% | 60% | 70% |
| INPUT | NOUN | 62% | 63% | 56% |
| ⋮ | ⋮ | ⋮ | ⋮ | ⋮ |

FIG. 14

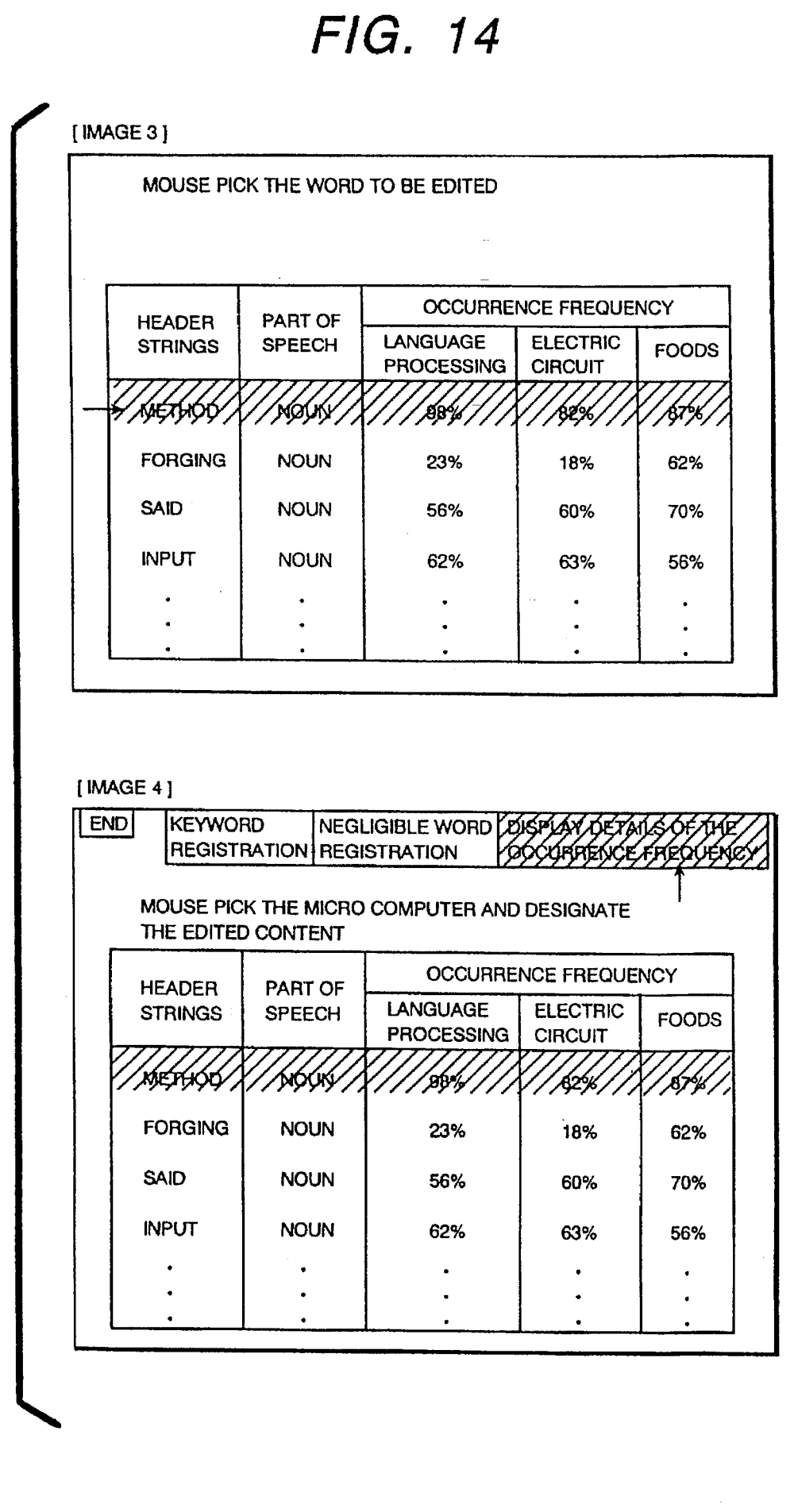

[ IMAGE 3 ]

MOUSE PICK THE WORD TO BE EDITED

| HEADER STRINGS | PART OF SPEECH | OCCURRENCE FREQUENCY | | |
|---|---|---|---|---|
| | | LANGUAGE PROCESSING | ELECTRIC CIRCUIT | FOODS |
| METHOD | NOUN | 98% | 82% | 87% |
| FORGING | NOUN | 23% | 18% | 62% |
| SAID | NOUN | 56% | 60% | 70% |
| INPUT | NOUN | 62% | 63% | 56% |
| ⋮ | ⋮ | ⋮ | ⋮ | ⋮ |

[ IMAGE 4 ]

| END | KEYWORD REGISTRATION | NEGLIGIBLE WORD REGISTRATION | DISPLAY DETAILS OF THE OCCURRENCE FREQUENCY |
|---|---|---|---|

MOUSE PICK THE MICRO COMPUTER AND DESIGNATE THE EDITED CONTENT

| HEADER STRINGS | PART OF SPEECH | OCCURRENCE FREQUENCY | | |
|---|---|---|---|---|
| | | LANGUAGE PROCESSING | ELECTRIC CIRCUIT | FOODS |
| METHOD | NOUN | 98% | 82% | 87% |
| FORGING | NOUN | 23% | 18% | 62% |
| SAID | NOUN | 56% | 60% | 70% |
| INPUT | NOUN | 62% | 63% | 56% |
| ⋮ | ⋮ | ⋮ | ⋮ | ⋮ |

FIG. 15

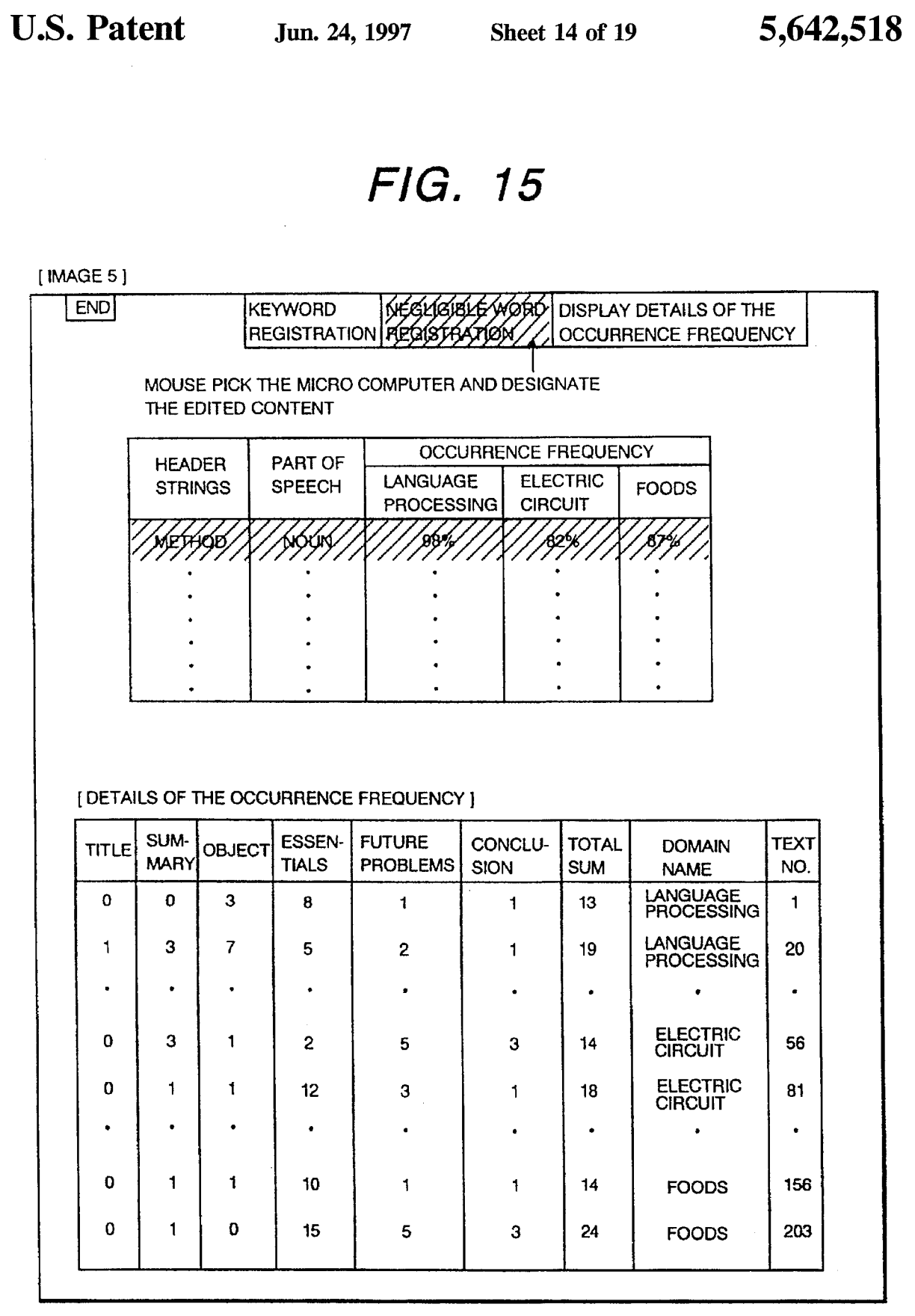

[ IMAGE 5 ]

| END | KEYWORD REGISTRATION | NEGLIGIBLE WORD REGISTRATION | DISPLAY DETAILS OF THE OCCURRENCE FREQUENCY |
|---|---|---|---|

MOUSE PICK THE MICRO COMPUTER AND DESIGNATE THE EDITED CONTENT

| HEADER STRINGS | PART OF SPEECH | OCCURRENCE FREQUENCY | | |
|---|---|---|---|---|
| | | LANGUAGE PROCESSING | ELECTRIC CIRCUIT | FOODS |
| METHOD | NOUN | 98% | 82% | 87% |
| · | · | · | · | · |
| · | · | · | · | · |
| · | · | · | · | · |

[ DETAILS OF THE OCCURRENCE FREQUENCY ]

| TITLE | SUM-MARY | OBJECT | ESSEN-TIALS | FUTURE PROBLEMS | CONCLU-SION | TOTAL SUM | DOMAIN NAME | TEXT NO. |
|---|---|---|---|---|---|---|---|---|
| 0 | 0 | 3 | 8 | 1 | 1 | 13 | LANGUAGE PROCESSING | 1 |
| 1 | 3 | 7 | 5 | 2 | 1 | 19 | LANGUAGE PROCESSING | 20 |
| · | · | · | · | · | · | · | · | · |
| 0 | 3 | 1 | 2 | 5 | 3 | 14 | ELECTRIC CIRCUIT | 56 |
| 0 | 1 | 1 | 12 | 3 | 1 | 18 | ELECTRIC CIRCUIT | 81 |
| · | · | · | · | · | · | · | · | · |
| 0 | 1 | 1 | 10 | 1 | 1 | 14 | FOODS | 156 |
| 0 | 1 | 0 | 15 | 5 | 3 | 24 | FOODS | 203 |

FIG. 16

| d1 | d2 | d3 | d4 |
|---|---|---|---|
| HEADER STRINGS | PART OF SPEECH | KEYWORD PROCESSING DOMAIN | NEGLIGIBLE WORD PROCESSING DOMAIN |
| ANALOG | NOUN | ELECTRIC CIRCUIT | LANGUAGE PROCESSING, FOODS |
| INTEGRATED | NOUN | ELECTRIC CIRCUIT | LANGUAGE PROCESSING, FOODS |
| CIRCUIT | NOUN | ELECTRIC CIRCUIT | LANGUAGE PROCESSING, FOODS |
| CURRENT | NOUN | ELECTRIC CIRCUIT | LANGUAGE PROCESSING, FOODS |
| • | • | • | • |
| DICTIONARY | NOUN | LANGUAGE PROCESSING | ELECTRIC CIRCUIT, FOODS |
| KEYWORD | NOUN | LANGUAGE PROCESSING | ELECTRIC CIRCUIT, FOODS |
| NEGLIGIBLE WORD | NOUN | LANGUAGE PROCESSING | ELECTRIC CIRCUIT, FOODS |
| CONTEXT | NOUN | LANGUAGE PROCESSING | ELECTRIC CIRCUIT, FOODS |
| • | • | | |
| SYNTAX | NOUN | LANGUAGE PROCESSING, ELECTRIC CIRCUIT | FOODS |
| ANALYSE | "SURU" VERB | LANGUAGE PROCESSING, ELECTRIC CIRCUIT | FOODS |
| • | • | • | • |
| INVESTIGATION | NOUN | NONE | TOTAL DOMAIN |
| OBJECT | NOUN | NONE | TOTAL DOMAIN |
| PROBLEM | NOUN | NONE | TOTAL DOMAIN |
| • | • | • | • |
| METHOD | NOUN | NONE | TOTAL DOMAIN |
| FORGOING | NOUN | NONE | TOTAL DOMAIN |
| SAID | NOUN | NONE | TOTAL DOMAIN |
| INPUT | NOUN | NONE | TOTAL DOMAIN |
| ⋮ | ⋮ | ⋮ | ⋮ |

FIG. 18

{ DOMAIN NAME } : LANGUAGE PROCESSING

{ TEXT NO. } : 1

{ KIND } : RESEARCH REPORT

{ KEYWORD } : DICTIONARY, KEYWORD, NEGLIGIBLE WORD · · ·

< TITLE >
A STUDY ON A DICTIONARY GENERATING METHOD

< SUMMARY >
A RESULT OF STUDY RELATED TO A GENERATION METHOD OF A DICTIONARY,
· · · · · · · · · · · · · · · · · · · · · · · · · · · · · · · · ·

{ DOMAIN NAME } : ELECTRIC CIRCUIT

{ TEXT NO. } : 5

{ KIND } : RESEARCH REPORT

{ KEYWORD } : DIGITAL, ANALOG, CURRENT, CIRCUIT, INTEGRATED, · · ·

< TITLE >
DIGITAL - TO - ANALOG CONVERTER

< SUMMARY >
FROM DITIGAL SIGNAL · · · · · · · · · · · · · · · · · · · ·

{ DOMAIN NAME } : FOODS

{ TEXT NO. } : 151

{ KIND } : RESEARCH REPORT

{ KEYWORD } : SAUSAGE, PROCESSING, PORK, · · ·

< TITLE >
SAUSAGE PROCESSING APPARATUS

< SUMMARY >
IN A SAUSAGE PROCESSING APPARATUS · · · · · · · · · · · ·

THREE TEXT DATA AS SHOWN NEXT ARE RETRIEVED

1 : TEXT NO. [ 5 ], KIND [ RESEARCH REPORT ], TITLE [ DIGITAL - TO - ANALOG CONVERTER ]

2 : TEXT NO. [ 21 ], KIND [ RESEARCH REPORT ], TITLE [ AN EVALUATION OF ELECTRIC CIRCUITS ]

3 : TEXT NO. [ 150 ], KIND [ RESEARCH REPORT ], TITLE [ AN EXTENSION OF DIGITAL ANALOG CIRCUIT ]

KEYWORD ASSIGNING METHOD AND SYSTEM THEREFOR

BACKGROUND OF THE INVENTION

1. Field of the Invention

The present invention relates to a keyword assigning method and system therefor to text data. More particularly, it concerns a keyword assigning system useful to assign keywords to a large amount of text data automatically.

2. Description of the Prior Art

A usual keyword assigning system was disclosed in, for example, the Japanese Patent Laid-Open No. 2-45876. This usual system is a system that extracts keyword candidates, presents the extracted keyword candidates to a user, and assigns the keywords selected by the user as retrieved keywords.

The usual keyword assigning systems heretofore used have the disadvantage that negligible words may be regarded as keywords. The user has to explicitly designate desired keywords to remove the negligible words. As an example, the text retrieving apparatus disclosed in the Japanese Patent Laid-Open No. 2-45876 serves in the way that a keyword extraction range should be specified by the user, keywords are extracted from among that range, desired keywords are selected from among the extracted keywords by the user to remove negligible words, thereby having only the keywords selected by the user as retrieved keywords.

The above-described usual keyword assigning system involves such problems that the user has to judge for determination of the retrieved keywords and at the same time, the words other than the keywords the user decided cannot be used by any other persons. Also, the usual system has the problem that although burden on the user is low if he or she treats text data of small scale, it is very hard for the user if a tremendous amount of text data has to be processed.

Further, the usual system has the problem that it has to often have the retrieved keywords manually assigned to the text data. The text created by the user himself or herself can easily have the retrieved keywords assigned thereto. However, it takes much time and is very hard work for a third person to proceed with assignment of the retrieved keywords to a large amount of text data.

SUMMARY OF THE INVENTION

In view of solving the foregoing problems of the prior arts, it is an object of the present invention to provide a keyword assigning method and system that can automatically extract and assign most of keywords by use of text data in a plurality of domains and occurrence frequencies of words in each of the domains.

Briefly, the foregoing object is accomplished in accordance with aspects of the present invention by a keyword assigning method and system.

The present invention is a keyword assigning method and system in a text processing system having an input/output device, a memory, and a processor, characterized in: extracting domain-wise keywords from text data on the basis of occurrence frequencies of domain-wise word occurrence collection data stored in the memory; extracting negligible words not capable of becoming domain-wise keywords from text data on the basis of occurrence frequencies of the domain-wise word occurrence collection data; storing the extracted domain-wise keywords and the extracted domain-wise negligible words; extracting words to become keywords from among words of the text data having said keywords assigned thereto by way of looking the stored keywords and the stored negligible words upon assignment of the keywords to any of the text data; and, assigning the extracted keywords to the text data.

More particularly, the present invention is characterized in: detecting numbers of occurrence times of words of a plurality of text data before registering the numbers of occurrence times in a word occurrence frequency table; obtaining occurrence frequencies of words in each of domains on the basis of the word occurrence frequency table before registering the occurrence frequencies in a domain-wise word occurrence collection table; extracting domain-wise keywords from text data on the basis of occurrence frequencies of the registered domain-wise word occurrence collection table; extracting negligible words not capable of becoming domain-wise keywords from text data on the basis of occurrence frequencies of the domain-wise word occurrence collection table; registering the extracted domain-wise keywords and the extracted domain-wise negligible words in a keyword and negligible word dictionary; extracting words to become keywords from among words of the text data having said keywords assigned thereto by way of looking the keywords and negligible words registered in the dictionary upon assignment of the keywords to any of the text data before assigning the extracted keywords to the text data.

The numbers of occurrence times of the words are obtained by detecting items composing the text data, detecting numbers of occurrence times of words by item in the text data, and obtaining total numbers of occurrence times of the words in the text data.

Occurrence frequencies of the words in each of the domains are given by obtaining a ratio of a number of text data having a word appeared therein to a number of text data in a single domain as occurrence frequency of the word.

Extracting the domain-wise keywords from the text data is made to extract words appearing in only one domain as keywords in the domain and at the same time, to extract words not appearing in one or more domains as keywords in a domain having the words appeared therein.

Extracting the negligible words not capable of becoming the domain-wise keywords from the text data is made to extract words appearing in all text data in all domains as negligible words common to the all domains.

Extracting the negligible words not capable of becoming the domain-wise keywords from the text data is made to extract words appearing all text data in one or more domains as negligible words in the domains.

Occurrence frequencies of words other than the ones extracted as the keywords and the negligible words are displayed by domain on the basis of the domain-wise word occurrence collection table to ask a user whether they should be registered in a keyword-negligible word dictionary as keywords or negligible words and depending on the user's instruction, to register them in the dictionary as keywords or negligible words.

The occurrence frequencies of the words other than the ones extracted as the keywords and the negligible words are displayed by domain on the basis of the domain-wise word occurrence collection table before numbers of occurrence times of words indicated by text data by a user are displayed on the basis of the domain-wise word occurrence collection table.

The keyword assignment is made by dividing the text data to have keywords assigned thereto, into words by looking a general dictionary before, and when if there exist words to become keywords in the text data in the domain thereof, looking the keyword-negligible word dictionary, then the words are assigned as keywords in said text data.

The keyword assignment-is made by dividing the text data to have keywords assigned thereto, into words by looking a general dictionary, looking the keyword-negligible word dictionary if there exist the words not to become keywords nor to become negligible words in the text data in the domain thereof, then the words are assigned as keywords in said text data.

The keyword assignment is made by dividing the text data to have keywords assigned thereto, into words by looking a general dictionary and if there exist words not to become keywords nor to become negligible words in the text data in the domain thereof, looking the keyword-negligible word dictionary then, asking a user therefor the words should be assigned as keywords to the text data and if the the user instructed as should be assigned, the words are assigned as keywords in said text data.

The words not to become keywords nor to become negligible words in the domain for the text data having the keywords assigned thereto, are registered into the keyword-negligible word dictionary.

The keyword assigning method and system of the present invention summarized above provide the following features and actions.

The keyword assigning system of the present invention looks text data and dividing the text data into words, registers results of the division in a word partitioning table, looks the word partitioning table to detect a word occurrence frequency before registering it in a word occurrence frequency table, looks a word occurrence frequency table to collect the word occurrence frequency before storing it in a work area, then extracts a keyword by looking results of the collection before storing it in a keyword-negligible word dictionary, extracts a negligible word by looking the domain-wise word occurrence collection table before storing the negligible word in the keyword-negligible word dictionary.

Then, the keyword assigning system looks the domain-wise word occurrence collection table in the work area, and when a user selects a word which has not been extracted as keyword or negligible word, and is selected by a user.

Further, the keyword assigning system looks at the text data and the keyword-negligible word dictionary and assigns a keyword to text data having had no keyword, and registers it as a text data with assigned keywords.

Thus, the present invention provides the effect that can save a tremendous amount of usual human assignment work of the keywords to the text data.

Also, the present invention provides the effect that if there exist different words which are not keyword nor negligible word, the different words can be inferred and assigned as new keywords thereby enabling self-increase of keywords.

The foregoing and other objects, advantages, manner of operation and novel features of the present invention will be understood from the following detailed description when read in connection with the accompanying drawings.

BRIEF DESCRIPTION OF THE DRAWINGS

In the accompanying drawings:

FIG. 4 is text data illustrating an example of text data;

FIG. 5 is a flow chart illustrating an example of a word partitioning table;

FIG. 9 is a table illustrating an example of a domain-wise word occurrence collection table;

FIG. 13 is a display screen illustrating an example of image presented to a user;

FIG. 14 is a display screen illustrating another example of image presented to a user;

FIG. 15 is a display screen illustrating still another example of image presented to a user;

FIG. 16 is a table illustrating an example of storage of a keyword-negligible word dictionary;

FIG. 18 is text data illustrating an example of assignment of keywords to text data having had no keywords assigned thereto by the keyword assigning unit;

DETAILED DESCRIPTION OF THE PREFERRED EMBODIMENT

The following describes in detail an embodiment according to the present invention by reference to the accompanying drawings.

Figure 1:
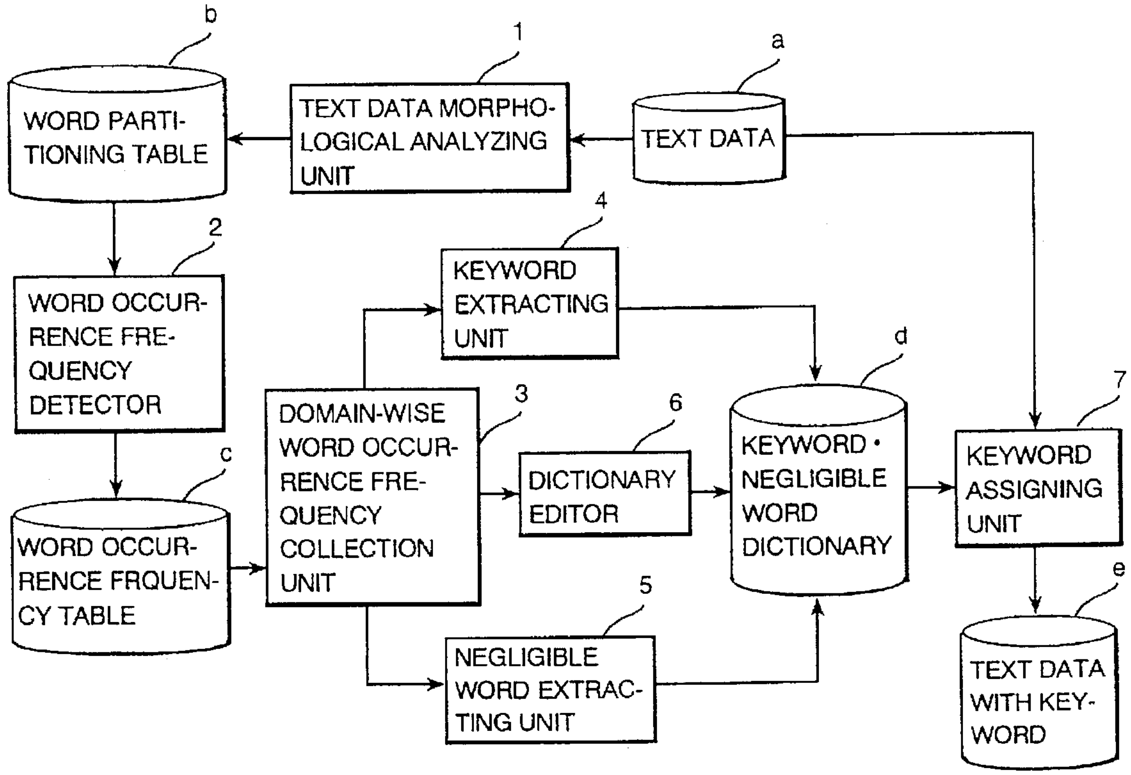
FIG. 1 is a functional block diagram illustrating a keyword assigning system in an embodiment of the present invention.

FIG. 1 depicts a functional block diagram illustrating a keyword assigning system in the embodiment of the present invention.

The text data morphological analyzing unit 1 looks text data a before dividing the text at data a into words by looking a general dictionary, which is a dictionary for use in a word processor, machine translation, etc. The text data morphological analyzing unit 1 then registers results of the division in a word partitioning table b.

The word occurrence frequency detector 2 looks at the word partitioning table b to detect a word occurrence frequency before registering it in a word occurrence frequency table c.

The domain-wise word occurrence frequency collection unit 3 looks at a word occurrence frequency table c to collect the word occurrence frequency by domain before storing it in a work area.

The keyword extracting unit 4 extracts a keyword by looking at results of the collection before storing it in a keyword-negligible word dictionary d.

The negligible word extracting unit 5 extracts a negligible word by looking at results of the collection before storing it in the keyword-negligible word dictionary d.

The dictionary editor 6 looks at the results of the collection of the work area before storing in the keyword-negligible word dictionary d as keyword or negligible word a word which has not been extracted as keyword or negligible word and is selected by a user.

The keyword assigning unit 7 looks at the text data a and the keyword-negligible word dictionary d before assigning a keyword to text data having had no keyword to register it as a text data e with keywords.

As described above, the keyword assigning feature accomplishes automatic assignment of the keyword to the text data.

As can be seen in the figure, the text data morphological analyzing unit 1, the word occurrence frequency detector 2, the domain-wise word occurrence frequency collection unit 3, the keyword extracting unit 4, the negligible word extracting unit 5, and the dictionary editor 6 are processing blocks, and the text data a, the word partitioning table b, the word occurrence frequency table c, the keyword-negligible word dictionary d, and the text data e with keywords are files or tables.

Figures 21, 22:
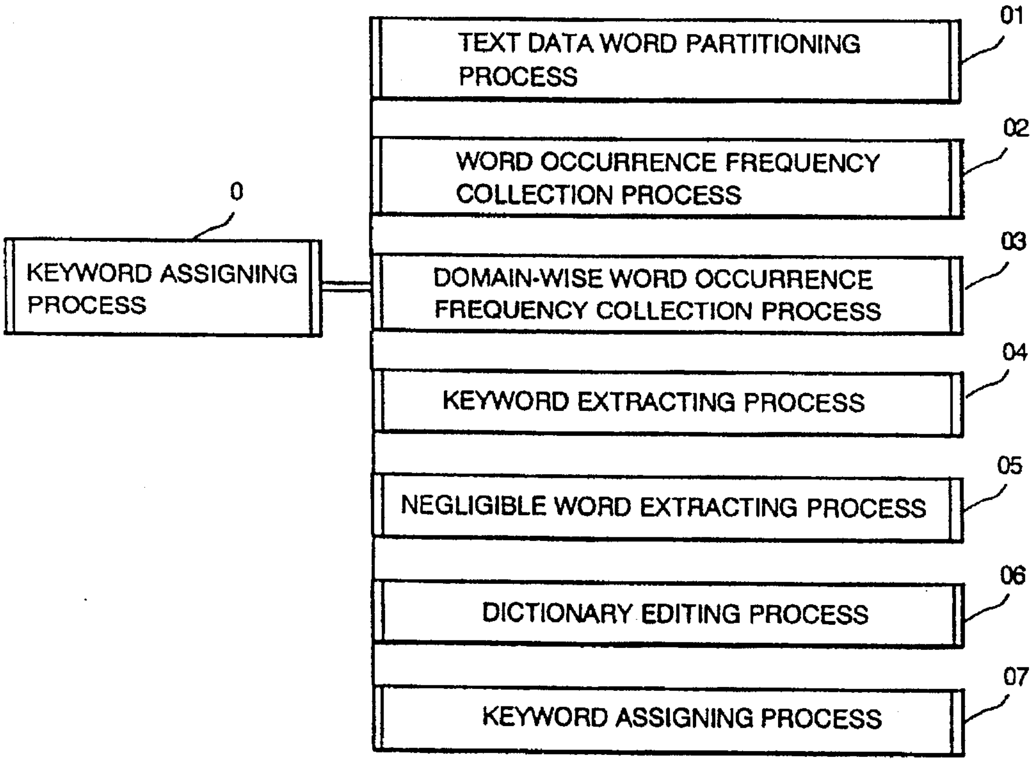
FIG. 21 is a display image illustrating an example of presentation of the text data retrieved at the natural language interface to the user.
FIG. 22 is a PAD (problem analysis diagram) illustrating a process of the functional block diagram shown for the keyword assigning system in FIG. 1.

FIG. 22 depicts a PAD (problem analysis diagram) illustrating a process of the functional block diagram shown for the keyword assigning system in the embodiment of the present invention in FIG. 1.

In the figure, a text data morphological analyzing step 01 looks at the text data a before dividing the text data a into words. The text data morphological analyzing unit 1 then registers results of the division in the word partitioning table b. The text data morphological analyzing step 01 corresponds to a text data word partitioning process shown in FIG. 3. An example of results of the process is tabulated in FIG. 5.

In turn, a word occurrence frequency collection step 02 looks at the word partitioning table b to detect the word occurrence frequency before registering it in the word occurrence frequency table c. A domain-wise word occurrence frequency collection step 03 looks at the word occurrence frequency table c to collect the word occurrence frequency by domain before storing it in the work area. The word occurrence frequency collection step 02 corresponds to a word occurrence frequency detecting process shown in FIG. 6. An example of results of the process is tabulated in FIG. 7.

In turn, a keyword extracting step 04 extracts a keyword by looking at results of the collection before storing it in the keyword-negligible word dictionary d. The keyword extracting step keyword extracting step 04 corresponds to a keyword extracting process shown in FIG. 10. An example of results of the process is tabulated in FIG. 16.

In turn, a negligible word extracting step 05 extracts the negligible word by looking results of the collection before storing it in the keyword-negligible word dictionary d. The negligible word extracting step 05 corresponds to a negligible word extracting process shown in FIG. 11. An example of results of the process is tabulated in FIG. 16.

In turn, a dictionary editing step 06 looks at the results of the collection of the work area before storing in the keyword-negligible word dictionary d as keyword or negligible word the word which has not been extracted as keyword or negligible word and is selected by the user. The dictionary editing step 06 corresponds to a dictionary editing process shown in FIG. 12. Examples of procedures of the process are displayed in FIGS. 13 to 15, and an example of results of the process is tabulated in FIG. 16.

In turn, a keyword assigning step 07 looks at the text data a and the keyword-negligible word dictionary d before assigning the keyword to text data having had no keyword to register it as the text data e with keywords. The keyword assigning step 07 corresponds to a keyword assigning process shown in FIG. 17. An example of results of the process is tabulated in FIG. 18.

Figure 2:
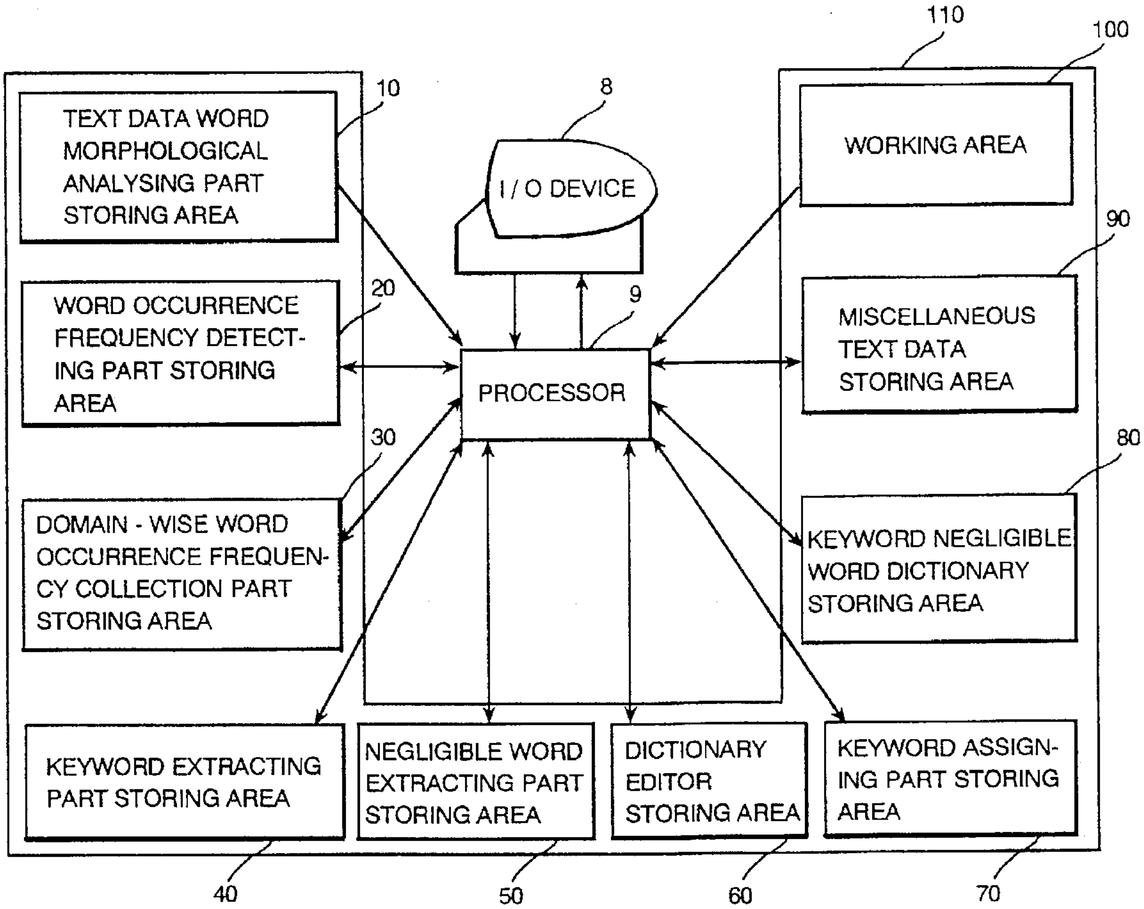
FIG. 2 is a overall block diagram illustrating a hardware configuration of the keyword assigning system.

FIG. 2 depicts a overall block diagram illustrating an hardware configuration of the keyword assigning system in FIG. 1. As shown in the figure, the hardware comprises an I/O device 8 and a processor 9.

The I/O device 8 has data entered and displays some information. The processor 9 executes the processes in FIG. 1 on the basis of a program. A memory 110 stores the text data a in FIG. 1 and various programs. The memory 110 has storing areas, including a working area 100 which is a memory for execution of processes of the processor 9 to store the word partitioning table b and the word occurrence frequency table c, etc., a text data word partitioning part storing area 10, a word occurrence frequency detecting part storing area 20, a domain-wise word occurrence frequency collection part storing area 30, a keyword extracting part storing area 40, a negligible word extracting part storing area 50, a dictionary editor storing area 60, a keyword assigning part storing area 70, a keyword-negligible word dictionary storing area 80 having the keyword-negligible word dictionary d stored therein, and a miscellaneous text data storing area 90 having the text data a and the text data e with keywords stored therein.

The programs stored in the memory 110 are executed by the processor 9. In the execution, the I/O device 8 is used as needed.

Figure 3:
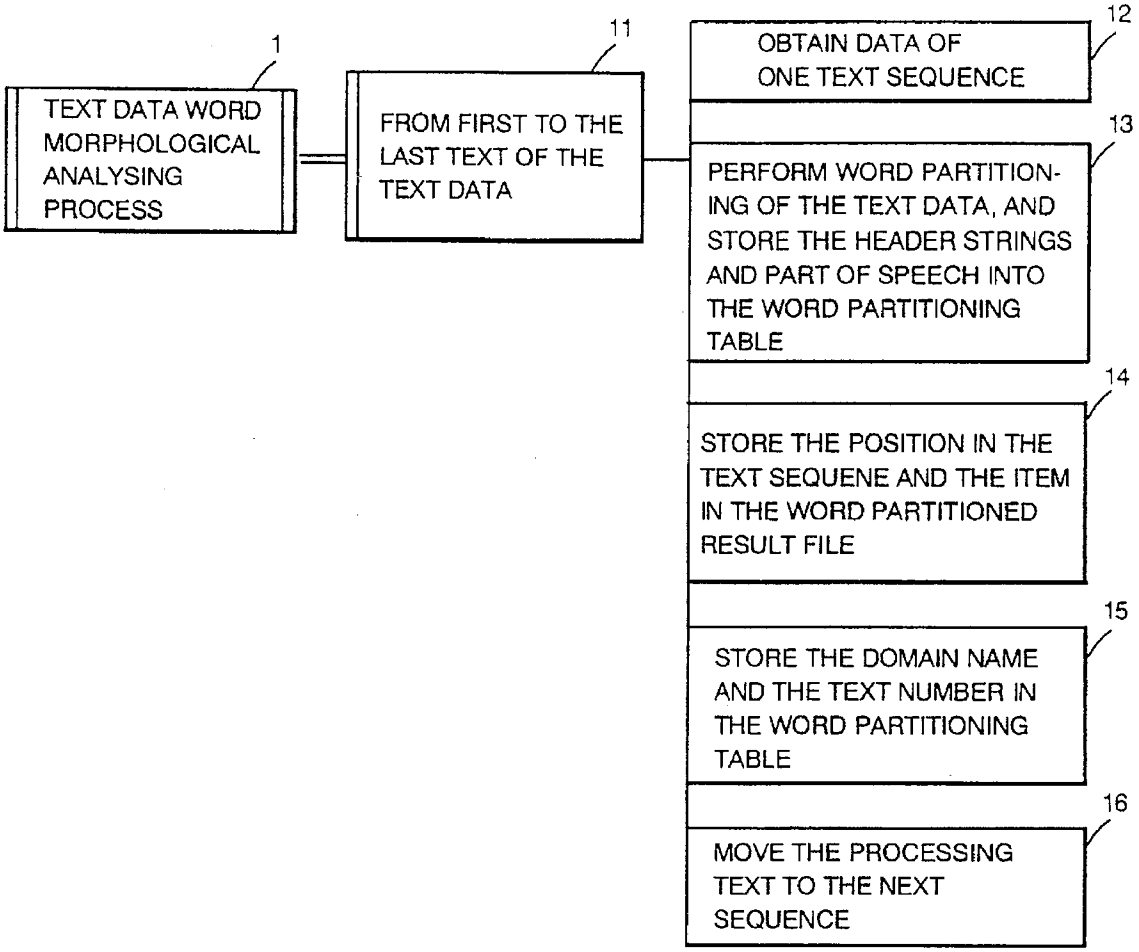
FIG. 3 is a PAD (problem analysis diagram) illustrating a process of a text data morphological analyzing unit.

FIG. 3 depicts a PAD (problem analysis diagram) illustrating a process of the text data morphological analyzing unit shown in FIG. 1.

The process in the figure gets text data from among the text data a, divides the text data into words, and stores the words in the word partitioning table b.

The process is described below in detail by reference to the PAD.

Step 11: Looks at the text data a to make process from the first to last texts of the text data in the following processing steps.

Step 12: Gets data of one text from among the text data a first (see FIG. 4).

Step 13: Divides the text data into words before storing their header strings and parts of speech in the respective header string column b1 and speech part column b2 of the word partitioning table b (see FIG. 5).

Step 14: Stores positions and items of the words of the text data in the respective position column b3 and item column b4 of the word partitioning table b.

Step 15: Stores domain names and text numbers of the text data in the respective domain name column b5 and text number column b6 of the word partitioning table b.

Step 16: Moves process control to the next text data.

As described above, steps 11 to 16 can get the text data a shown in FIG. 4, divide the text data a into the words, and store them in the word partitioning table b.

FIG. 4 depicts text data illustrating an example of text data of the text data a having a domain name and a text number. The example has the domain name "language processing" and the text number "1" entered therein. The text data include "title", "summary", "object", and "future problems".

FIG. 5 depicts a chart illustration of an example of word partitioning table b having a header string column b1, a speech part column b2, a position column b3, an item column b4, a domain name column b5, and a text number column b6. The header string column b1 has character strings composing the divided words entered therein, the speech part column b2 has parts of speech, the position column b3 has positions at which the corresponding words exist in the text data, the item column b4 is an item representing a structure of the text, the domain name column b5 has field names of the corresponding text data, and the text number column b6 has identification numbers of the text data.

Figure 6:
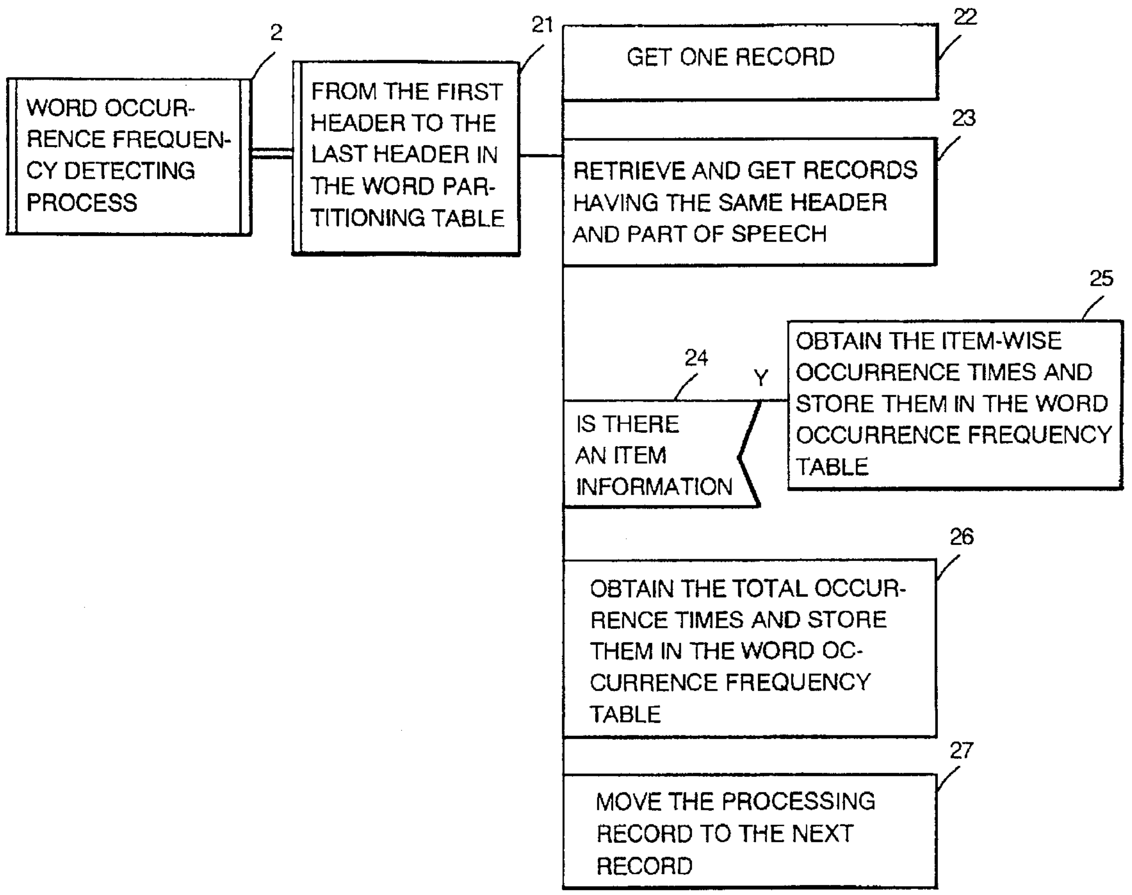
FIG. 6 is a PAD illustrating a process of word occurrence frequency detector.

FIG. 6 depicts a PAD illustrating a process of the word occurrence frequency detector shown in FIG. 1. The process is to obtain a number of occurrence times of each of the words appearing in the same text data.

The process is described below in detail by reference to the PAD.

Step 21: Looks at the word partitioning table b to make process from the first to last records of the word partitioning table in the following processing steps.

Step 22: Looks at the word partitioning table b and gets data of one record. Note that the data of one record are data on a single row of the word partitioning table b, including, for example, "title", "noun", "row 1", "title", "language processing", and "1" on row 1 shown in the figure.

Step 23: Retrieves another record having the same header string b1 and speech part b2 from the word partitioning table b to hold.

Step 24: Judges whether or not the item composing the corresponding record exists.

Step 25: If so, obtains the number of occurrence times of each of the words by item before storing it in the word occurrence frequency table c.

Step 26: Obtains the numbers of occurrence times of the words of the all text data before storing them in the word occurrence frequency table c (see FIG. 7).

Step 27: Moves the record to be processed to the next record.

Figures 7, 8:
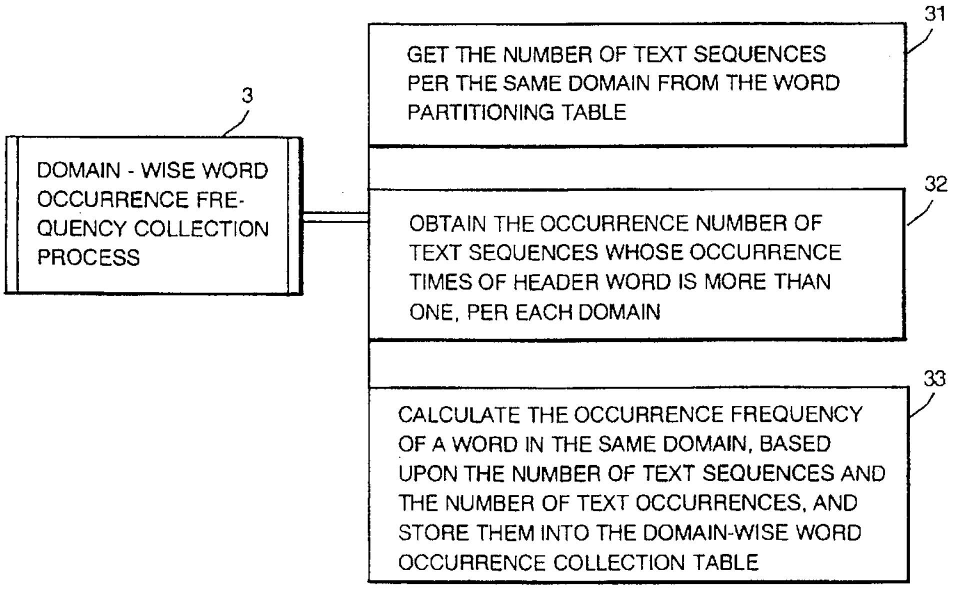
FIG. 7 is a table illustrating an example of a word occurrence frequency table.
FIG. 8 is a PAD illustrating a process of a domain-wise word occurrence frequency collection unit.

As described above, steps 21 to 27 can generate the word occurrence frequency table c shown in FIG. 7 from the word partitioning table b shown in FIG. 5.

FIG. 7 depicts a table illustrating an example of word occurrence frequency table c shown in FIG. 1. The example has a header string column C1, a speech part column C2, a title column C3 to a conclusion column C8, a total sum column C9, a domain column C10, and a text number column C11.

The header string column C1 has character strings composing the divided words entered therein, the speech part column C2 has parts of speech, the position column C3 to the conclusion column C8 have numbers of occurrence times of the words appearing in the items composing the text data, the total sum column C9 has the numbers of occurrence times of the words appearing in the text data, the domain column C10 has domain names of the corresponding text data, and the text number column C11 has identification numbers of the text data.

FIG. 8 depicts a PAD illustrating a process of the domain-wise word occurrence frequency collection unit 3 shown in FIG. 1. The process is to collect occurrence frequencies of the words by domain.

The process is described below in detail by reference to the PAD.

Step 31: Looks at the word occurrence frequency table c and holds number of text sequences of each of the domains.

Step 32: Obtains and holds occurrence number of text sequences for each of the header words whose total number of occurrence times is one or more times, per each domain. An example of said total number is as shown in FIG. 7, the total sum 19 of occurrence times of a header string "natural language" in the text No. 1.

Step 33: Obtains occurrence frequency of each of the words in the same domain, or (occurrence number of text sequences)/(number of text data in same domain)×100%, on the basis of the number of text sequences of each of the domains held in step 31 and the occurrence number of text sequences held in step 32. Stores the header string, the part of speech, and the occurrence frequency in the domain-wise word occurrence collection table (see FIG. 9).

As described above, steps 31 to 33 can generate the domain-wise word occurrence collection table shown in FIG. 9 from the word occurrence frequency table c shown in FIG. 7. It should be noted that the table is stored in the working area.

FIG. 9 depicts a table illustrating an example of domain-wise word occurrence collection table. The example includes a header string column W1, a speech part column W2, and an occurrence frequency column W3.

The header string column W1 has character strings composing words entered therein, the speech part column W2 has parts of speech of the words, and the occurrence frequency column W3 has occurrence frequencies of the words in the domains of the text data, including the "language processing", "electrical circuit", and "foods" in the embodiment.

Figure 10:
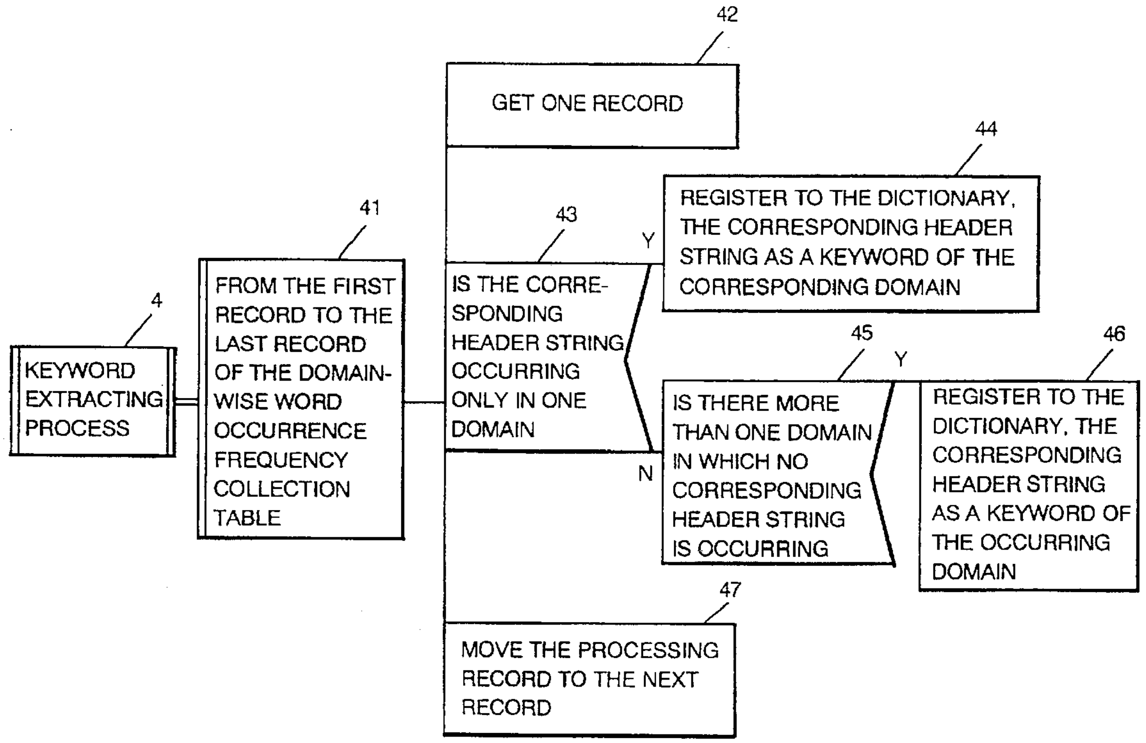
FIG. 10 is a PAD illustrating a process of a keyword extracting unit.

FIG. 10 depicts a PAD illustrating a process of the keyword extracting unit 4 shown in FIG. 1. The process is to extract keywords of the text data on the basis of the occurrence frequencies of the words by domain.

The process is described below in detail by reference to the PAD.

Step 41: Starts the following processing steps from the first to last records in the domain-wise word occurrence collection table.

Step 42: Gets data of one record from the domain-wise word occurrence collection table.

Step 43: Judges whether or not the header string of the corresponding word appears in only one domain.

Step 44: If so, registers the corresponding word in the keyword-negligible word dictionary d as a keyword for the only one domain of occurrence (FIG. 16).

Step 45: If not, judges whether or not one or more domains have no occurrence of the corresponding word.

Step 46: If so, registers the corresponding word in the keyword-negligible word dictionary d as a keyword for the one or more domains of occurrence.

Step 47: Moves the record to be processed to the next record.

As described above, steps 41 to 47 can extract the keyword on the basis of the domain-wise word occurrence collection table shown in FIG. 9 before storing it in the keyword-negligible word dictionary d shown in FIG. 16.

The words that can be stored in the process include words from "analog" to "analyse" in a header string column d1 in FIG. 16.

Figure 11:
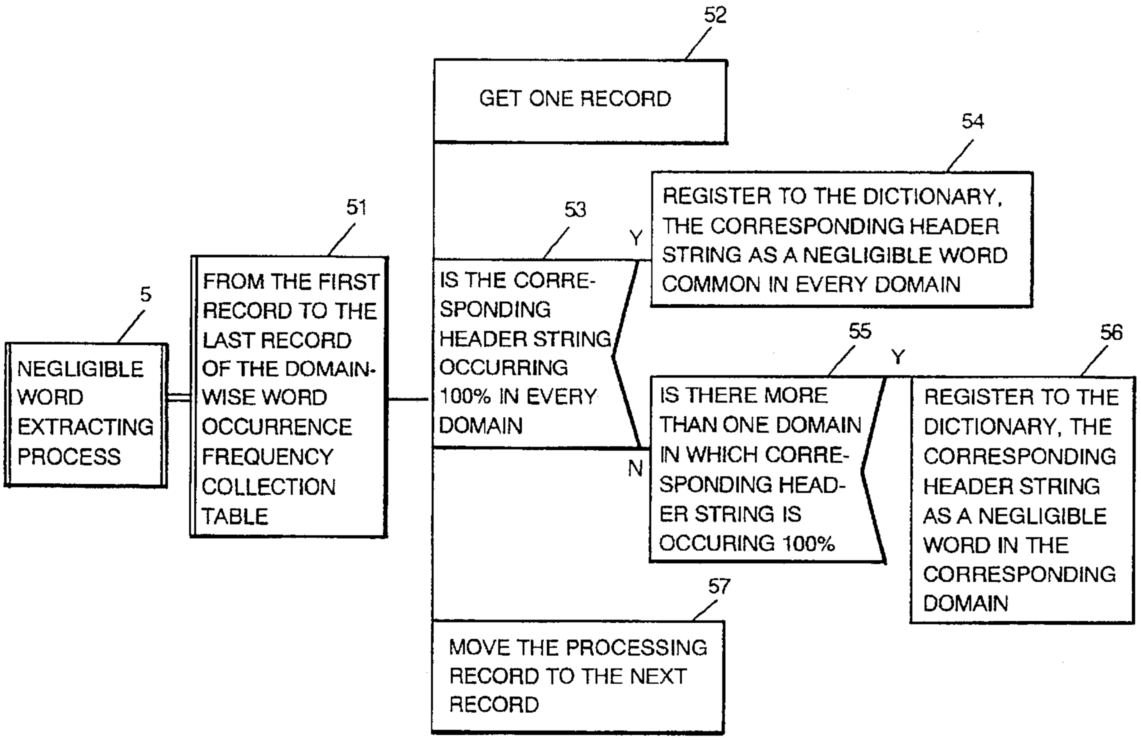
FIG. 11 is a PAD illustrating a process of a negligible word extracting unit.

FIG. 11 depicts a PAD illustrating a process of the negligible word extracting unit 5 shown in FIG. 1. The process is to extract negligible words of the text data on the basis of the occurrence frequencies of the words by domain.

The process is described below in detail by reference to the PAD.

Step 51: Starts the following processing steps from the first to last records in the domain-wise word occurrence collection table.

Step 52: Gets data of one record from the domain-wise word occurrence collection table.

Step 53: Judges whether or not the header string of the corresponding word appears in all text data in all domains, that is, judges whether or not the header string of the corresponding word appears at an occurrence frequency of 100%.

Step 54: If so, registers the corresponding word in the keyword-negligible word dictionary d as a negligible word for all the domains of occurrence.

Step 55: If not, judges whether or not one or more domains have occurrence of the corresponding word in all the text data of any domain, or at an occurrence frequency of 100%.

Step 56: If so, registers the corresponding word in the keyword-negligible word dictionary d as a negligible word for the one or more domains of occurrence.

Step 57: Moves the record to be processed to the next record.

As described above, steps 51 to 57 can extract the negligible word on the basis of the domain-wise word occurrence collection table shown in FIG. 9 before storing it in the keyword-negligible word dictionary d shown in FIG. 16.

The words that can be stored in the process include words from "investigation" to "problem" in the header string column d1 in FIG. 16.

Figure 12:
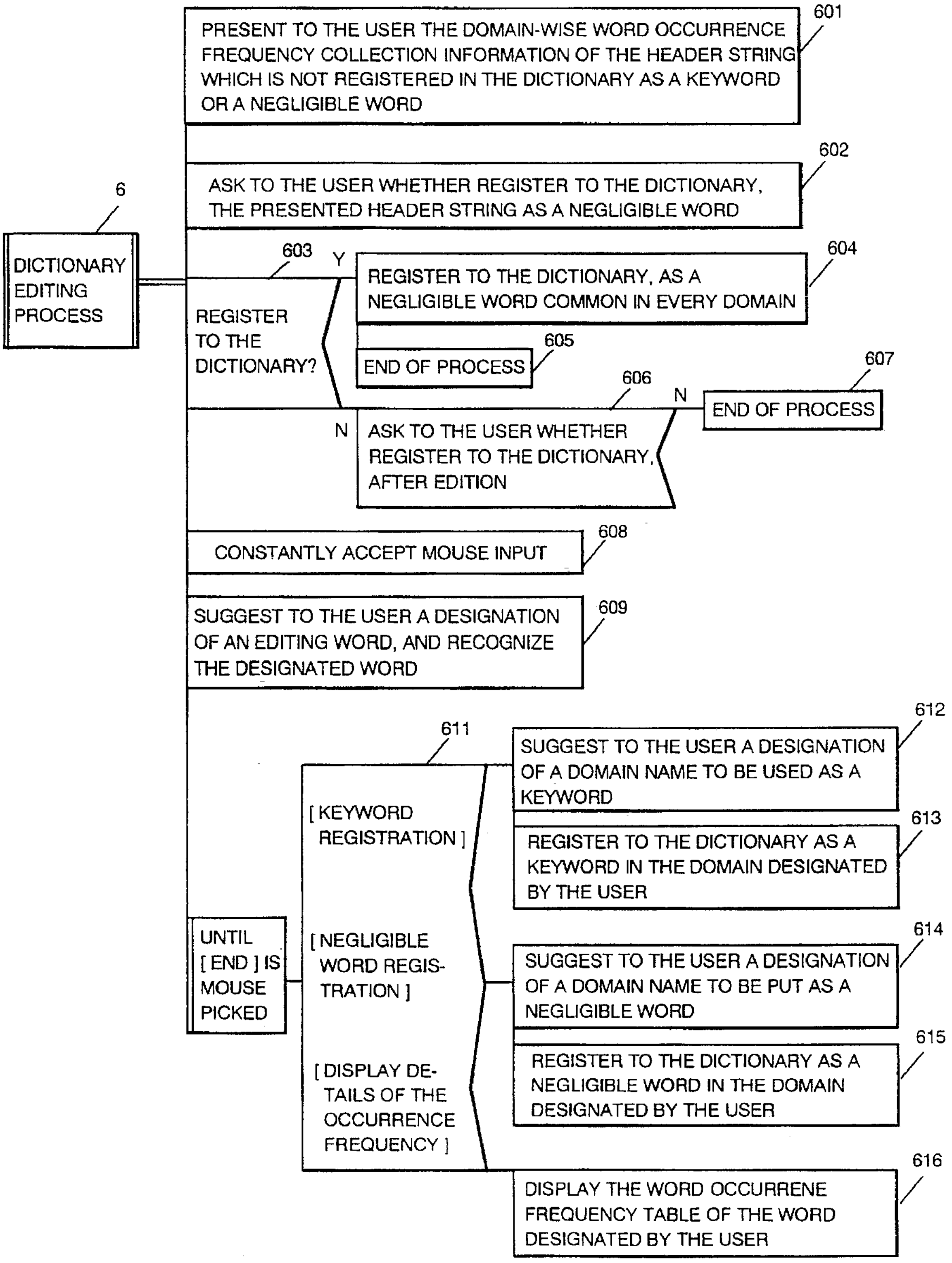
FIG. 12 is a PAD illustrating a process of a dictionary editor.

FIG. 12 depicts a PAD illustrating a process of the dictionary editor 6 shown in FIG. 1. The process is to prompt a user to check information as to dictionary registration of the word which is not registered in the keyword-negligible word dictionary d as keyword or negligible word before making the dictionary registration.

The process is described below in detail by reference to the PAD.

Step 601: Presents to the user the information of the domain-wise word occurrence collection table of the word which is not registered in the dictionary as the keyword or negligible word.

Step 602: Asks the user whether or not the presented word should be registered in the keyword-negligible word dictionary d as the negligible word. An example of presentation to the user is shown in Image 1 in FIG. 13.

Step 603: Judges an indication given by the user.

Step 604: If the indication is to register the word in the dictionary as negligible word, registers the word in the keyword-negligible word dictionary d as the negligible word for all the domains.

Step 605: Then, ends the process.

Step 606: If the indication is not to register the word in the dictionary as negligible word, makes the user edition before asking him or her whether or not the word should be registered in the dictionary.

Step 607: If not, ends the process. An example of asking the user in this step is shown in Image 2 in FIG. 13.

Step 608: Always accepts a mouse input on the display.

Step 609: Asks the user to designate the word to be edited before recognizing the word picked up by the mouse. An example of asking the user in this step is shown in Image 3 in FIG. 14. Assume that the designated word is "method".

Step 610: Starts the following processing steps until an icon "end" on the display is designated.

Step 611: Judges of which three icons "keyword registration", "negligible word registration", and "display details of occurrence frequency" are designated by the user.

Step 612: If the icon "keyword registration" is designated, asks the user to designate a domain for the corresponding word as the keyword.

Step 613: Registers the word in the keyword-negligible word dictionary d as the keyword for the domain designated by the user.

Step 614: If the icon "negligible word registration" is designated, asks the user to designate a domain for the corresponding word as the negligible word.

Step 615: Registers the word in the keyword-negligible word dictionary d as the negligible word for the domain designated by the user.

Step 616: If the icon "display details of occurrence frequency" is designated, present to the user the information of the word occurrence frequency table for the word designated by the user. An example of designation of the icon "display details of occurrence frequency" for the word "method" is shown in Image 4 in FIG. 14. An example of presentation of the information of the word occurrence frequency table, also, is shown in image 5 of FIG. 15.

Also, the former example in FIG. 15 shows designation of the icon "negligible word registration" to register in the dictionary after the user has seen the information of the word occurrence frequency table.

As described above, steps 601 to 616 allows the user to intervene to register in the keyword-negligible word dictionary d the word having not been registered by the keyword extracting unit 4 and the negligible word extracting unit 5 as the keyword or negligible word.

FIGS. 13 to 15 are display screen images as described above.

FIG. 16 depicts a table illustrating an example of storage of the keyword-negligible word dictionary d in FIG. 1. The example includes a header string column d1, a speech part column d2, a keyword covering domain d3, and a negligible word covering domain d4. The header string column d1 has character strings of words entered therein, the speech part column d2 has parts of speech of the words, the keyword covering domain d3 has domains in which the corresponding words are keywords, and the negligible word covering domain d4 has domains in which the corresponding words are negligible.

Words "analog" to "analyse" in the header string column d1 are the words extracted by the keyword extracting unit 4 and stored as keywords. Words "investigation" to "problem"

are the words extracted by the negligible word extracting unit 5 and stored as negligible words. Words "method" to "input" are the examples registered and stored by the dictionary editor 6 as judgement of the user. The words "analog" to "analysis" in the header string column d1 also has negligible word covering domains registered and stored by the dictionary editor 6 as judgement of the user.

Figure 17:
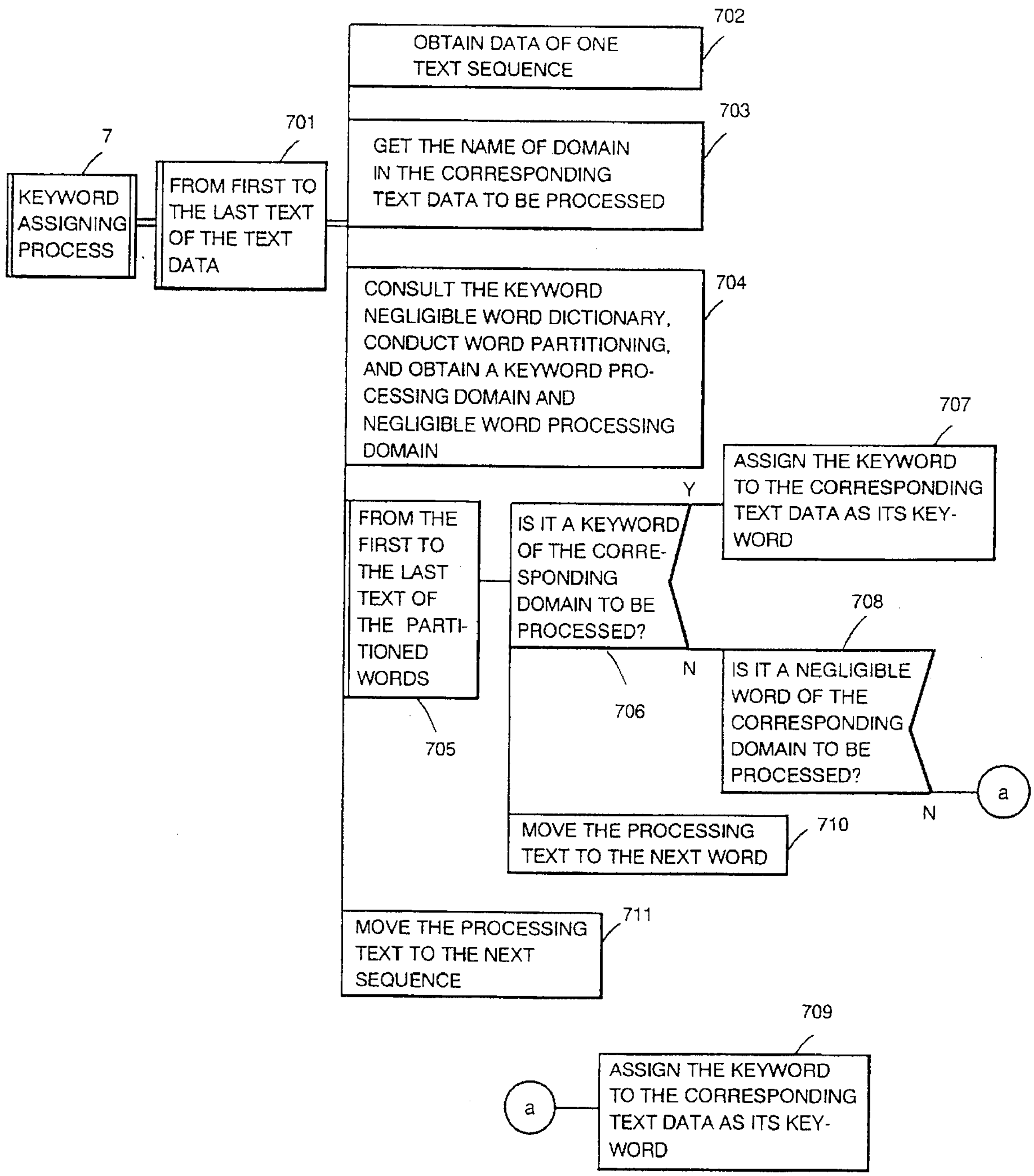
FIG. 17 is a PAD illustrating a process of a keyword assigning unit.

FIG. 17 depicts a PAD illustrating a process of the keyword assigning unit 7 shown in FIG. 1. The process is to assign a keyword to the text data having had no keyword assigned.

The process is described below in detail by reference to the PAD.

Step 701: Starts the following processing steps from the first to last text data of the text data a.

Step 702: Gets data of one text from among the text data a first.

Step 703: Gets a domain name, for example, "language processing", for the text data.

Step 704: Divides the text data into words by reference to the general dictionary having basic functional words and contents words stored therein before holding results of the word division. Also, gets the keyword covering domain d3 and the negligible word covering domain d4 by reference to the keyword-negligible word dictionary d.

Step 705: Starts the following processing steps from the first to last words of the results of the word division.

Step 706: Judges whether or not each of the words of the text data is keyword for the domain to which the text data are belonged.

Step 707: If so, assign the word to the text data as keyword.

Step 708: If not, judges whether or not the word is a negligible word for the specific domains of the text data.

Step 709: If the word is not a negligible word, or if the word is not found in the header string column, assigns the word to the text data as keyword.

Step 710: After the judgement in step 706, moves processing control to the next word.

Step 711: After the judgement in step 705, moves processing control to the next text data.

In assigning the corresponding word to the text data as keyword in step 709, the user is asked whether the word should be assigned as keyword. If so, the corresponding word is assigned to the text data as keyword before being registered in the keyword-negligible word dictionary d as keyword for the corresponding covering domain. This makes it possible to assign the keyword to the text data more securely.

As described above, steps 701 to 711 allows assigning the keywords to the text data having had no keywords assigned thereto as shown by an example in FIG. 18.

FIG. 18 depicts text data illustrating an example of assignment of keywords to text data having had no keywords assigned thereto by the keyword assigning unit 7.

As described so far, the embodiment explained above provides the effect that can save a tremendous amount of usual human assignment work of the keywords to the text data in the way that most of the keywords are automatically extracted and assigned by use of the text data in a plurality of domains and the occurrence frequencies of the words in the specific domains.

Also, the embodiment provides the effect that if there exist different words which are not keyword nor negligible word upon assignment of keyword in the course of extraction of the keywords together with the negligible words, the different words can be inferred and assigned as new keywords. That is, the keywords can be self-increased.

It is obvious that most of the words that have been not extracted by the keyword extracting unit 4 and the negligible word extracting unit 5 in the embodiment are negligible words. However, there is a possibility that the words include unique keywords that can be frequently used in particular domains. The embodiment has the dictionary editor 6 put therein to allow the user to intervene to select desired unique keywords and negligible words, thereby easily registering them in the dictionary.

In turn, the following describes an example of natural language interface by use of the keyword-negligible word dictionary d generated by the keyword assigning system of the present invention.

Figure 19:
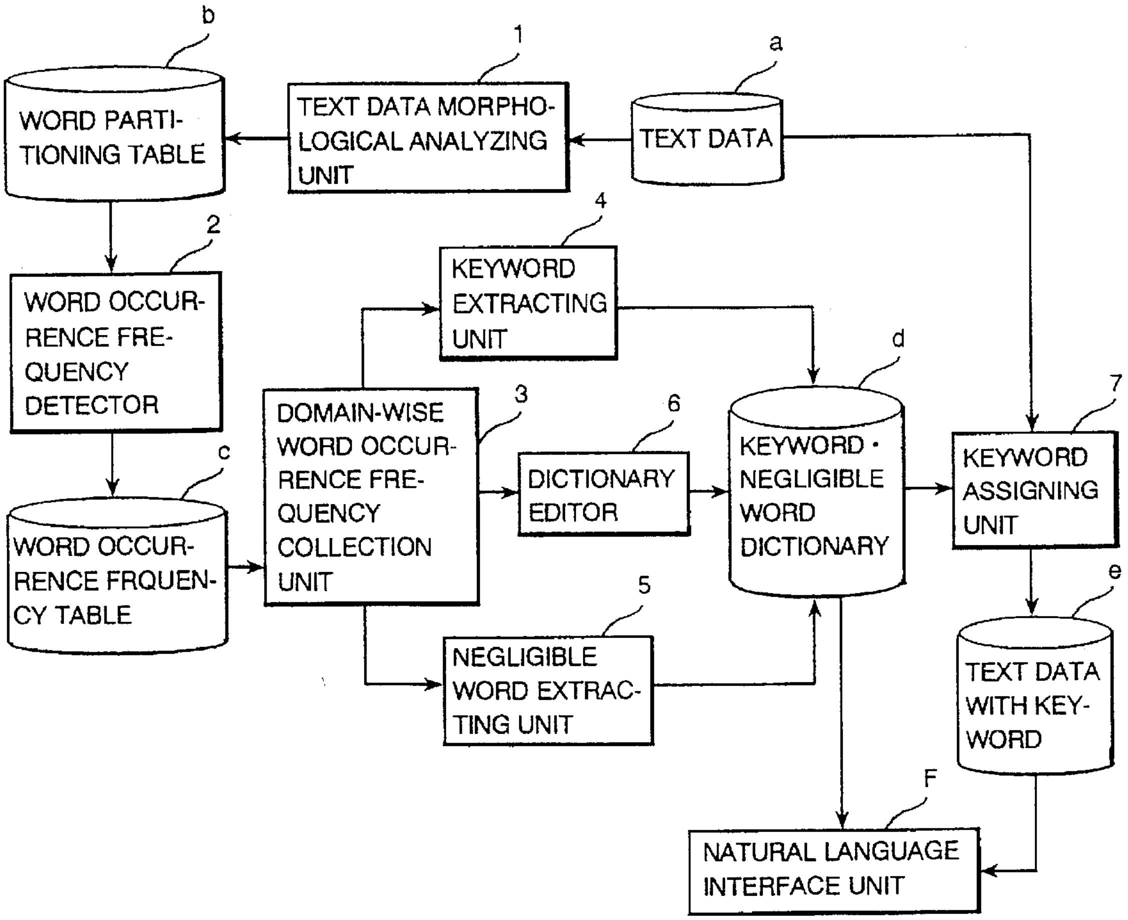
FIG. 19 is a functional block diagram illustrating a system for accomplishing text retrieval by natural language through a natural language interface with use of the keyword-negligible word dictionary generated.

FIG. 19 depicts a functional block diagram illustrating a system for accomplishing text retrieval by natural language through the natural language interface with use of the keyword-negligible word dictionary d generated by the keyword assigning system of the present invention. A natural language interface unit F in the figure looks the keyword-negligible word dictionary d, understands the natural language, retrieves the text data from the text data e with keywords as demanded by a user, and presents results to him or her.

Figure 20:
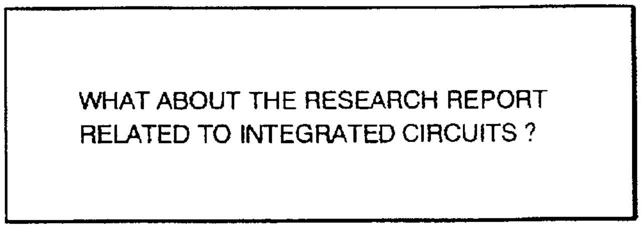
FIG. 20 is a statement illustrating an example of natural language entered at a natural language interface by a user.

The natural language interface unit F determines given terms of such a natural language as in FIG. 20 entered by the user by looking the keyword-negligible word dictionary d, recognizes keywords contained in the entered statement, retrieves the text data containing the recognized keywords from the text data e with keywords, and presents results to him or her.

FIG. 21 depicts a display image illustrating an example of presentation of the retrieved text data to the user.

Such a use of the text data e with keywords through the natural interface makes it possible to retrieve the text data by natural language.

The keyword assigning system according to the present invention provides the effect that can save a tremendous amount of usual human assignment work of the keywords to the text data in the way that most of the keywords are automatically extracted and assigned by use of the text data in a plurality of domains and the occurrence frequencies of the words in the specific domains.

Also, the embodiment provides the effect that if there exist different words which are not keyword nor negligible word, the different words can be inferred and assigned as new keywords. That is, the keywords can be self-increased.

What is claimed is:

1. A keyword assigning method in a text processing system having a memory and a processor, comprising:

- a step performed by said processor, of extracting domain-wise keywords from text data in one of a plurality of texts, on the basis of occurrence frequencies of domain-wise word occurrence collection data stored in a memory;
- a step of extracting negligible words, each occurring at a frequency of more than a specific occurrence ratio in all of said plurality of texts, by consulting said domain-wise word occurrence collection data;
- a step of storing the extracted domain-wise keywords and the extracted domain-wise negligible words to said memory;

a step of inputting a text for assigning a keyword, to said text processing system;

a step of extracting a word as a keyword by way of consulting the stored keywords and the stored negligible words; and, a step of assigning the extracted keyword to the inputted text.

2. The keyword assigning method according to claim 1, wherein the step of extracting the domain-wise keywords from the text data extracts words appearing in only one domain and at the same time, not appearing in other domains as keywords in the domain having the words appeared therein.

3. The keyword assigning method according to claim 1, wherein the step of extracting the negligible words extracts words appearing in all said texts in all domains as negligible words common to all the domains.

4. The keyword assigning method according to claim 1, wherein the step of extracting the negligible words extracts words appearing in all said texts in one or more domains as negligible words in all the domains.

5. The keyword assigning method according to claim 1, wherein each of the steps of storing the domain-wise keywords and the domain-wise negligible words is a dictionary editing step of registering occurrence frequencies of words other than the ones extracted as the keywords and the negligible words, into a keyword-negligible word dictionary on the basis of the domain-wise word occurrence collection data.

6. The keyword assigning method according to claim 5, wherein the dictionary editing step further comprises:

a substep of, after displaying occurrence frequencies of the words other than the ones extracted as the keywords and the negligible words, by domain on the basis of the domain-wise word occurrence collection data, displaying numbers of text-wise occurrence times of words indicated by a user on the basis of the domain-wise word occurrence collection data.

7. The keyword assigning method according to claim 1, wherein the keyword assigning step further comprises:

a substep of dividing the text data of said inputted text into words by consulting a general dictionary for assigning the words as keywords, if there exist the words to become keywords in the text data in the domain thereof, by consulting the stored keywords and the stored negligible words.

8. The keyword assigning method according to claim 1, wherein the keyword assigning step further comprises:

a substep of dividing the text data of said inputted text into words by consulting a general dictionary;

a substep of assigning the words as keywords; and a substep of consulting the stored keywords and the stored negligible words, and if there exists words which are not to become keywords nor negligible words in the text data in the domain thereof, assigning the words as keywords thereto.

9. The keyword assigning method according to claim 1, wherein the keyword assigning step further comprises:

a substep of dividing the text data of said inputted text into words by consulting a general dictionary; and, a substep of assigning words as keywords if the words are not to become keywords nor negligible words in the text data in the domain thereof by consulting the stored keywords and the stored negligible words and if the assignment is externally requested.

10. The keyword assigning method according to claim 8, wherein the keyword assigning step further comprises:

a substep of registering words not to become keywords nor negligible words in the domain for the text data into said memory.

11. A keyword assigning method in a text processing system having a memory and a processor, comprising:

a step of detecting numbers of occurrence times of words in one of a plurality of text data;

a step of storing the numbers of occurrence times as word occurrence frequency data;

a step of obtaining occurrence frequencies of words in each of domains on the basis of the word occurrence frequency data;

a step of storing the obtained occurrence frequencies as domain-wise word occurrence collection data;

a step of extracting domain-wise keywords from said text data on the basis of occurrence frequencies of the stored domain-wise word occurrence collection data;

a step of extracting negligible words, each occurring at a frequency of more than a specific occurrence ratio in all of said plurality of texts, by consulting said domain-wise word occurrence collection data;

a step of storing the extracted domain-wise keywords and the extracted domain-wise negligible words to said memory;

a step of inputting a text for assigning a keyword, to said text processing system;

a step of extracting a word as a keyword by way of consulting the stored keywords and the stored negligible words in said memory; and, a step of assigning the extracted keyword to the text data.

12. The keyword assigning method according to claim 11, wherein the step of detecting the numbers of occurrence times of the words in one of the plurality of the text data further comprises:

a substep of detecting items composing the text data, detecting numbers of occurrence times of words by item in the text data, and obtaining total numbers of occurrence times of the words in the text data.

13. The keyword assigning method according to claim 11, wherein the step of obtaining occurrence frequencies of the words in each of the domains further comprises:

a substep of obtaining a ratio of a number of text data in which a word occurs, to a number of text data in a single domain, as occurrence frequency of the word.

14. The keyword assigning method according to claim 11, wherein the step of storing comprises generating a keyword-negligible word dictionary for a plurality of domains.

15. The keyword assigning a method according to claim 11, wherein the keyword assigning step further comprises:

a substep of dividing the text data of said inputted text into words by consulting a general dictionary;

a substep of assigning the words as keywords;

a substep of consulting the stored keywords and the stored negligible words, and if there exists words which are not to become keywords nor negligible words in the text data in the domain thereof, assigning the words as keywords thereto; and, a substep of registering words not to become keywords nor negligible words in the domain for the text data into said memory.

16. A keyword assigning system in a text processing system having a memory and a processor, comprising:

means for extracting domain-wise keywords from text data in one of a plurality of texts, on the basis of occurrence frequencies of domain-wise word occurrence collection data stored in a memory;

means for extracting negligible words, each occurring at a frequency of more than a specific occurrence ratio in all of said plurality of texts, by consulting said domain-wise word occurrence collection data;

means for storing the extracted domain-wise keywords and the extracted domain-wise negligible words to said memory;

means for inputting a text for assigning a keyword, to said text processing system;

means for extracting a word as a keyword by way of consulting the stored keywords and the stored negligible words in said memory; and, means for assigning the extracted keyword to the inputted text.

17. The keyword assigning system according to claim 16, wherein the step of storing comprises generating a keyword-negligible word dictionary for a plurality of domains.

18. The keyword assigning system according to claim 16, wherein the keyword assigning step further comprises:

a substep of dividing the text data of said inputted text into words by consulting a general dictionary;

a substep of assigning the words as keywords;

a substep of consulting the stored keywords and the stored negligible words, and if there exists words which are not to become keywords nor negligible words in the text data in the domain thereof, assigning the words as keywords thereto; and, a substep of registering words not to become keywords nor negligible words in the domain for the text data into said memory.

19. A keyword assigning system in a text processing system having a memory and a processor, comprising:

means for detecting numbers of occurrence times of words in one of a plurality of text data; means for storing the numbers of occurrence times as word occurrence frequency data;

means for obtaining occurrence frequencies of words in each of domains on the basis of the word occurrence frequency data; means for storing the obtained occurrence frequencies as domain-wise word occurrence collection data;

means for extracting domain-wise keywords from said text data on the basis of occurrence frequencies of is the stored domain-wise word occurrence collection data;

means for extracting negligible words, each occurring at a frequency of more than a specific occurrence ratio in all of said plurality of texts, by consulting said domain-wise word occurrence collection data;

means for storing the extracted domain-wise keywords and the extracted domain-wise negligible words to said memory;

means for inputting a text for assigning a keyword, to said text processing system;

means for extracting a word as a keyword by way of consulting the stored keywords and the stored negligible words in said memory; and, means for assigning the extracted keyword to the text data.

20. The keyword assigning a system according to claim 19, wherein the keyword assigning step further comprises:

a substep of dividing the text data of said inputted text into words by consulting a general dictionary;

a substep of assigning the words as keywords;

a substep of consulting the stored keywords and the stored negligible words, and if there exists words which are not to become keywords nor negligible words in the text data in the domain thereof, assigning the words as keywords thereto; and, a substep of registering words not to become keywords nor negligible words in the domain for the text data into said memory.

* * * * *